United States Patent
Breen et al.

(10) Patent No.: US 7,546,477 B2
(45) Date of Patent: Jun. 9, 2009

(54) WAKE INTERVAL ADJUSTMENT BASED ON CHARGE LEVEL

(75) Inventors: Thomas Bernard Breen, Broomall, PA (US); James Daniel Phelan, Paoli, PA (US)

(73) Assignee: General Electric Company, Schenectady, NY (US)

(*) Notice: Subject to any disclaimer, the term of this patent is extended or adjusted under 35 U.S.C. 154(b) by 81 days.

(21) Appl. No.: 11/648,235

(22) Filed: Dec. 29, 2006

(65) Prior Publication Data

US 2008/0162968 A1  Jul. 3, 2008

(51) Int. Cl.
*G06F 1/32* (2006.01)
(52) U.S. Cl. .............. 713/323; 713/340; 340/572.1; 320/132
(58) Field of Classification Search ............ 713/323, 713/340; 340/572.1; 320/132; 324/433
See application file for complete search history.

(56) References Cited

U.S. PATENT DOCUMENTS

| | | | |
|---|---|---|---|
| 5,491,486 A | 2/1996 | Welles, II et al. | |
| 5,797,094 A | 8/1998 | Houde et al. | |
| 5,940,771 A | 8/1999 | Gollnick et al. | |
| 6,163,690 A | 12/2000 | Lilja | |
| 6,182,807 B1 | 2/2001 | Saito et al. | |
| 6,493,649 B1 | 12/2002 | Jones et al. | |
| 6,710,719 B1 | 3/2004 | Jones et al. | |
| 6,816,977 B2 * | 11/2004 | Brakmo et al. | 713/323 |
| 6,882,274 B2 * | 4/2005 | Richardson et al. | 340/539.13 |
| 6,947,732 B2 | 9/2005 | Fraser | |
| 6,993,351 B2 | 1/2006 | Fraser et al. | |
| 7,026,919 B2 | 4/2006 | Pearlman et al. | |
| 7,027,808 B2 | 4/2006 | Wesby | |
| 7,133,703 B2 * | 11/2006 | Aoshima et al. | 455/574 |
| 7,400,149 B2 * | 7/2008 | Koster et al. | 324/429 |
| 2003/0185162 A1 | 10/2003 | Fraser et al. | |
| 2005/0222784 A1 * | 10/2005 | Tuff et al. | 702/61 |
| 2006/0241817 A1 * | 10/2006 | Patenaude | 701/1 |

* cited by examiner

*Primary Examiner*—Thuan N Du
(74) *Attorney, Agent, or Firm*—Drinker Biddle & Reath LLP

(57) ABSTRACT

A method and system are disclosed for adjusting a wake interval in a telematics device having a charge sensor. The telematics device cyclically provides full power from a power supply during a wake duration, and limited power from the power supply during the wake interval. A charge level for a battery of the power supply is determined using the charge sensor. The wake interval is adjusted based on the charge level.

20 Claims, 4 Drawing Sheets

WAKE INTERVAL ADJUSTMENT BASED ON CHARGE LEVEL

BACKGROUND OF THE INVENTION

Mobile tracking units such as telematics devices may be used to track mobile assets such as vehicles (e.g., motor vehicles in a fleet), trailers, freight rail cars, shipping containers, and the like. Typically, a telematics device includes a navigation set, such as a Global Positioning System (GPS) receiver or other suitable navigation set, responsive to navigation signals transmitted by a set of navigation stations which can be either space- or earth-based. In each case, the navigation set is capable of providing data indicative of the mobile asset location based on the navigation signals. In addition, the telematics device can include a suitable communications system that may, for example, comprise an electromagnetic emitter or transceiver for transmitting to a remote location the mobile asset position data and other data acquired with sensing elements in the mobile asset.

While telematics devices typically include an internal power source such as a small rechargeable battery, telematics devices often are deployed in conditions that afford limited or intermittent access to an external power source for operating the device or recharging the battery. For example, in a telematics device affixed to a trailer, the internal battery may be able to receive a charge from an electrical connection to an auxiliary power source on an attached tractor, but will not receive any charge when the trailer is not attached to a tractor (e.g., when the trailer has been delivered to or deposited at a destination).

In some telematics devices, a battery can be supplemented by an array of solar panels arranged on an exterior surface of the asset, and configured to recharge the battery. However, a solar power source may often be unable to fully recharge the battery for any of numerous reasons, such as absence of sunlight, suboptimal weather conditions, dust or debris on the solar panels, or when the asset is parked wholly or partially in shade or under cover. Other supplemental external power sources, such as wind or piezoelectric power sources, are also unable to provide continuous power when the asset is not in motion.

The unavailability of continuous external power presents challenges in achieving efficient power management. Mobile tracking units used in a power-starved environment must be substantially power efficient in order to provide reliable and economical operation. Since both the navigation set and the communications system comprise devices which, when energized, generally consume a large portion of the overall electrical power consumed by the mobile tracking unit, it is desirable to control the timing of when such devices are activated or deactivated, so as to reduce the overall power consumption of the mobile tracking unit, while retaining acceptable performance in tracking of the mobile asset.

Some existing telematics devices are able to conserve power by entering a low-power mode (sometimes known as a sleep mode or hibernating mode) during periods when no external power source is available, and to wake up at fixed intervals to permit tracking. However, a fixed wake interval does not adequately address the perceived need to locate a mobile asset promptly on demand (e.g., immediately upon polling the telematics device), because the device will often be in sleep mode when it is polled.

In other telematics devices, when the battery charge reaches zero or falls below a predetermined level, the device may simply turn off without notice. Such an outcome is undesirable, especially when tracking mobile assets that contain perishable or valuable cargo.

SUMMARY OF THE INVENTION

In one embodiment, the invention comprises a method for adjusting a wake interval in a telematics device having a charge sensor. The telematics device cyclically provides full power from a power supply during a wake duration, and limited power from the power supply during the wake interval. A charge level for a battery of the power supply is determined using the charge sensor. The wake interval is adjusted based on the charge level.

In another embodiment, the invention comprises a system for adjusting a wake interval in a telematics device. The telematics device includes a power supply configured to provide power to a location device and a communications system. A controller is operably coupled to the location device, to the communications system, to the power supply, and to a charge sensor adapted to provide charge level information to the controller for a battery of the power supply. The controller is configured to permit the power supply to provide full power to the location device and the communications system during a wake duration, and not to permit the power supply to provide full power to the location device and the communications system during the wake interval. The controller is also adapted to adjust the wake interval responsively to the charge level information.

Additional objects, advantages and novel features of the invention will be set forth in part in the description, examples and figures which follow, and in part will become apparent to those skilled in the art on examination of the following, or may be learned by practice of the invention.

BRIEF DESCRIPTION OF THE DRAWINGS

For the purpose of illustrating the herein described systems and methods, drawings are provided; with the understanding, however, that the herein described system and methods are not limited to the precise arrangements and instrumentalities shown.

DETAILED DESCRIPTION

Aspects of the present invention provide a telematics device capable of operating in a power-starved environment. An exemplary telematics device has a duty cycle comprising a wake duration (during which the device is awake) and a wake interval (during which the device is in a sleep mode). In an embodiment of the invention, the wake interval can be increased or decreased based on the charge level of a battery in the telematics device, thus allowing for acceptably fast polling responses in unpowered mobile assets (i.e., assets that are not connected to an external power supply), without substantially compromising battery life.

When the battery is at a relatively high level of charge, the wake interval can be short (i.e., fast). In an illustrative example, wake intervals of fifteen minutes' sleep time, separating wake durations of seven minutes each, may be an appropriate duty cycle for a relatively high charge level. Conversely, in the same example, wake intervals of twelve hours, separating wake durations of five minutes each, may be a more appropriate duty cycle when the charge level decreases to a relatively low level.

Figure 1:
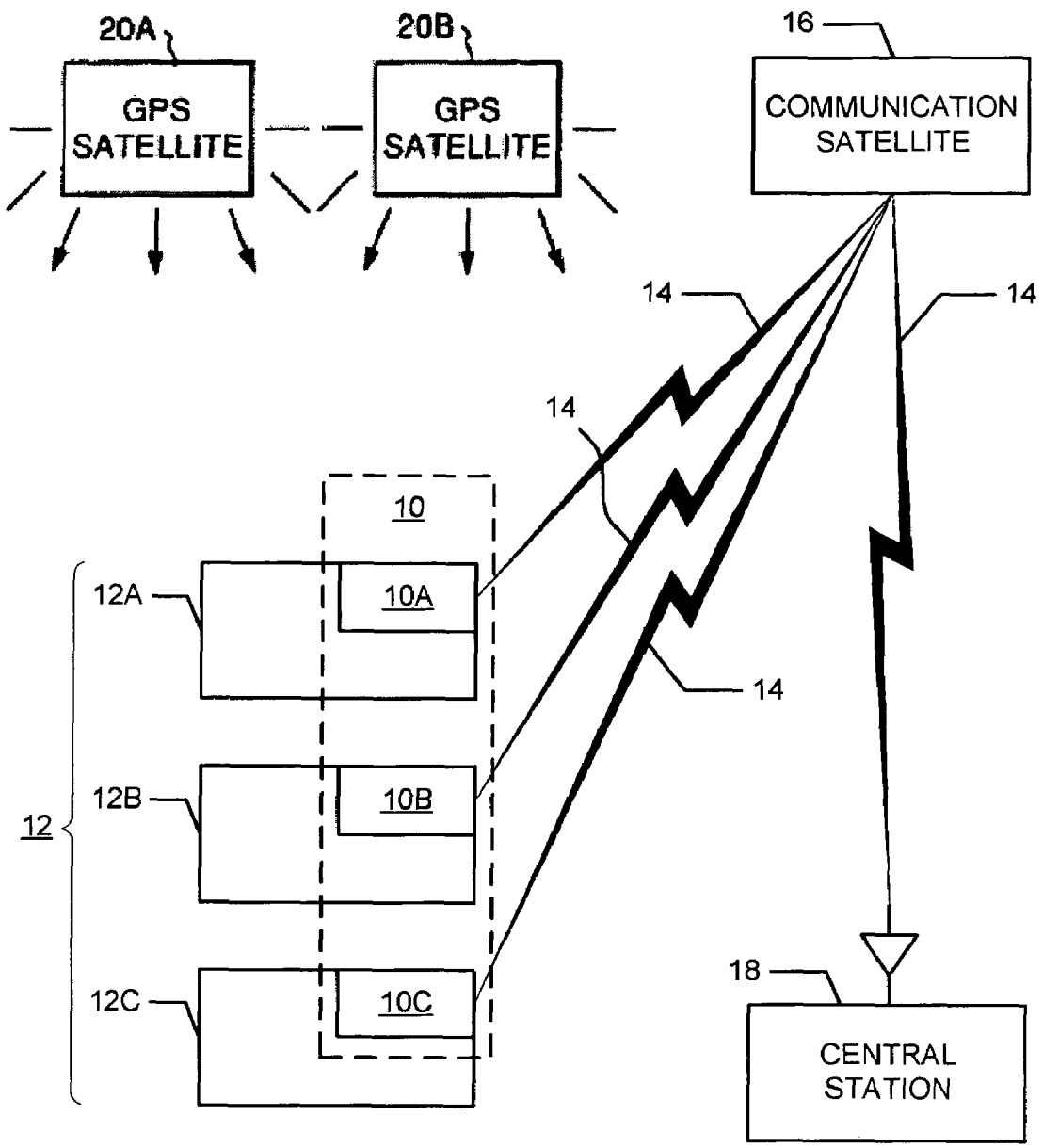
FIG. 1 is a block diagram representation of an exemplary mobile asset tracking system of the prior art which can employ a telematics device unit in accordance with an embodiment of the present invention.

Referring to the drawings, in which like reference numerals indicate like elements, FIG. 1 is a block diagram representation of an exemplary mobile asset tracking system which can employ a telematics device unit in accordance with an embodiment of the present invention. The exemplary tracking system is particularly useful in fleet vehicle management, rail car tracking, cargo location and the like. As used herein, the terms "asset" and "mobile asset" include, but are not limited to, vehicles, trailers, rail cars, shipping containers, and other means of carrying or transporting goods on board a vehicle or platform such as ships, aircrafts, land vehicles, or other vehicles. One exemplary suitable mobile asset tracking system is described in U.S. Pat. No. 5,491,486 to Welles II et al., issued Feb. 13, 1996, and assigned to the present assignee.

FIG. 1 shows, by way of example and not of limitation, telematics devices which employ navigation signals from a GPS satellite constellation, although other navigation systems can be used in lieu of GPS, as further discussed below. In the illustrative embodiment, a constellation of GPS satellites, such as GPS satellites 20A and 20B, provides highly accurate navigation signals which can be used to determine mobile asset position and velocity when acquired by a suitable GPS receiver.

In an illustrative embodiment, the mobile asset tracking system comprises a set of telematics devices 10A-10C (hereinafter collectively designated as telematics devices 10) which are installed, respectively, in mobile assets 12A-12C (hereinafter collectively designated as mobile assets 12) which are to be tracked or monitored. A multiple communication link 14, such as a satellite communication link using a communication satellite 16, can be provided between each of the telematics devices 10 and a central station 18. Communication link 14 can be conveniently used for transmitting mobile asset location, conditions, or events measured with suitable sensing elements, to the central station 18.

In some embodiments, central station 18 can comprise a remote control station manned by one or more operators and having suitable display devices and the like for displaying location and status information for each mobile asset equipped with a respective mobile tracking unit. In other embodiments, central station 18 comprises a processor (e.g., a server) having a memory. In further embodiments, the processor of central station 18 can in turn be linked to a mapping system capable of generating or displaying routes of travel between various locations based on criteria specified by the processor of the central station 18.

More generally, an exemplary central station 18 may be any facility having a communications system capable of two way communications with the telematics device 10. For example, the communication system of central station 18 can be a public or private wireless network that allows two way communications between the central station 18 and the communications system 52 (shown in FIG. 2) of the telematics device 10. The communications system of central station 18 and the communications system 52 of the telematics device 10 are compatible for transferring data between a processor linked to the central station 18 and the controller 58 (shown in FIG. 2) of the telematics device 10 on the mobile asset 12.

Figure 2:
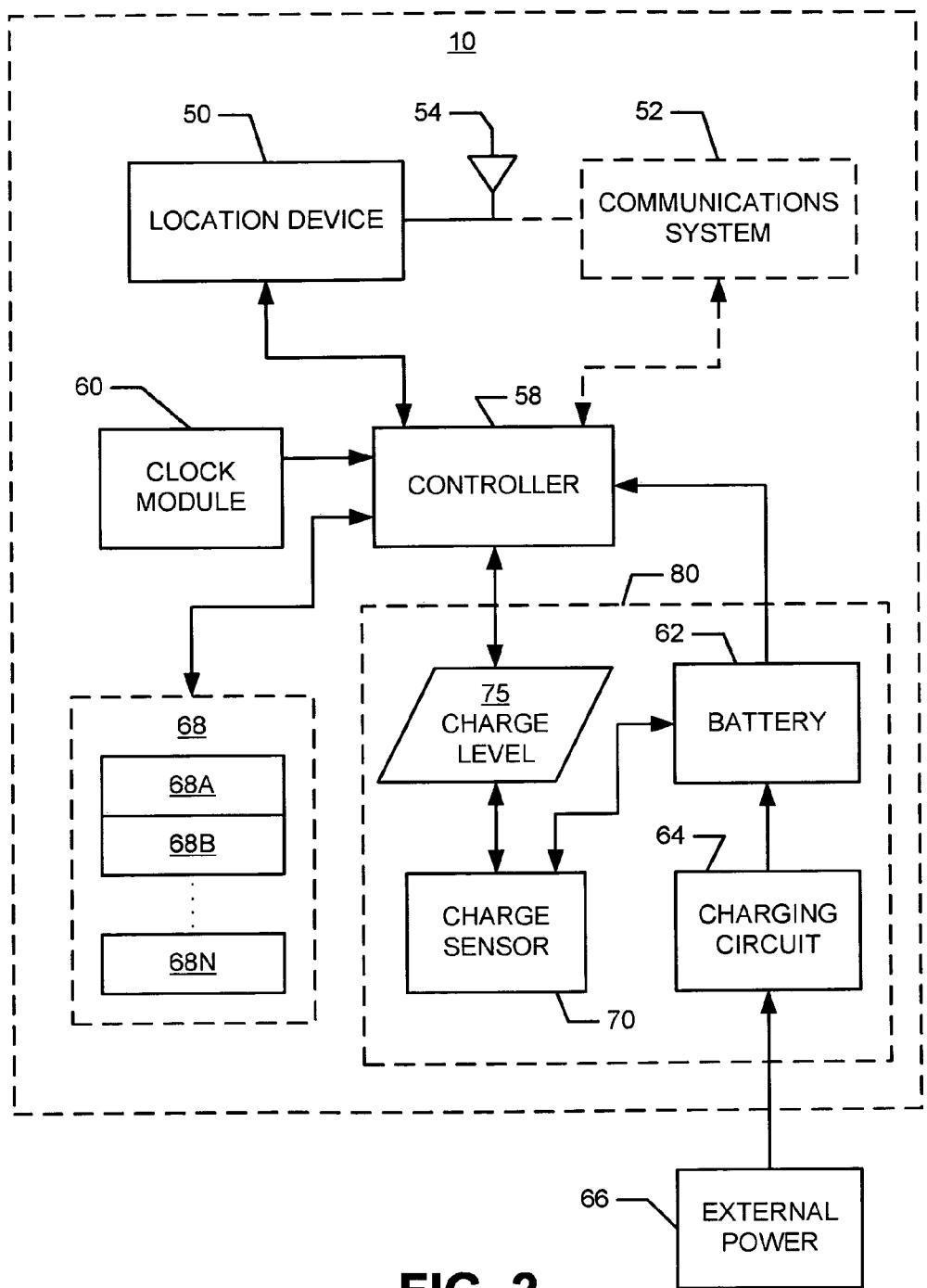
FIG. 2 is a block diagram representation of an exemplary telematics device in an embodiment of the present invention.

FIG. 2 depicts an exemplary telematics device 10 in an embodiment of the present invention. Embodiments of telematics device 10 can include the following components: a location device 50, a communications system 52, a controller 58 comprising at least a processor and a memory, a charge sensor 70, one or more additional sensors 68A-68N (collectively referred to as sensors 68), a battery 62, and a charging circuit 64 that can be connected to an external power source 66. In an exemplary embodiment, the location device 50 and communications system 52 are electrically linked to the battery 62 so as to be able to draw power from the battery 62. The telematics device 10 may be a single unit which contains all of the components, or individual components, or groups of components, linked together.

The location device 50 comprises a position determining system, examples of which include the Global Positioning System (GPS), Differential GPS (DGPS), Eurofix DGPS, and the Global Navigation Satellite System (GLONASS). Embodiments of the present invention are well-suited to use any position determining system (both terrestrial and satellite based) as well as future systems that may be developed, and are not dependent on the use of a particular system. The location device 50 is connected to an antenna 54 to receive signals from external geo-location references (such as exemplary satellites 20A, 20B). The geo-location references utilized will depend upon the location device 50. For example, when a GPS receiver is used, the geo-location references will comprise a portion of the set of GPS (also known as NAVSTAR) satellites. In other types of geo-location systems, the geo-location references could be cellular communication towers, or other locations/system which provide reference points utilized by the location device 20.

The location device 50 may be part of, or integrated with, the transceiver or receiver of the communications system 52. Alternatively, the location device 50 may be a separate device specifically for determining the location of the mobile asset 12, or a receiver integrated within the telematics device 10.

The antenna 54 for the location device 50 may be integrated into the location device 50 or may be a separate component linked to location device 50 either directly or through linkages in the telematics device 10. In an embodiment, the position of the mobile asset 12 can be determined using another type of locating system, such as a system of terrestrial towers that transmit signals to and/or receive signals from a receiver/transmitter located in or on the mobile asset. Such a system can use propagation times between the mobile asset and the terrestrial towers to triangulate the mobile asset's position. This type of triangulation system can be implemented, for example, using a cellular telecommunication infrastructure.

Communications system 52 can be connected to the antenna 54 to communicate mobile asset position data to central station 18. In an exemplary embodiment, communications system 52 is capable of transmitting mobile asset position data through antenna 54 to communication satellite 16, which transmits the data through communication link 14 to the central station 18. In some embodiments, a single antenna 54 can be conveniently used for both GPS signal acquisition and satellite communication. In a typical embodiment, the communications system 52 may be any wireless system located on the mobile asset 12 which is linked to the controller 58 and that allows two-way communications between the telematics device 10 on the asset 12 and the communications system 52 linked to a central station 18. The antenna 54 for the communications system 52 may be integrated into the communications system 52 or may be a separate component which is linked to the communications system 52 either directly or through a plurality of linkages in the telematics device 10.

The controller 58 comprises at least a processor suitably programmed to control operation of location device 50 and communications system 52, and comprises memory, such as magnetic, optical or solid-state memory. The processor of controller 58 may be part of an embedded device (e.g., an onboard computer with limited functionality) or can be a general use processor that is part of the mobile asset 12. Controller 58 is linked to the battery 62, the location device 50, the sensors 68, the communications system 52, and a real-time clock module 60. Clock module 60 can provide information useful for enabling the controller 58 to periodically wake up (i.e., resume operation) after the controller 58 is in a "sleep mode" associated with a low power mode of operation.

A power supply 80 comprising a power source such as battery 62 can be used to enable operation of the telematics device 10. In some embodiments, power supply 80 comprises a charging circuit 64 for the battery, and a charge sensor 70. In other embodiments, either or both of the charge sensor 70 and charging circuit 64 can be separate components from power supply 80.

In a typical embodiment, battery 62 can be a rechargeable battery such as a lead-acid battery, a lithium-ion battery, a nickel-cadmium battery, or another type of rechargeable battery. Battery 62 may also comprise voltage and/or current regulatory circuitry to supply power to other components in the telematics device 10. In further embodiments, one or more additional or backup batteries (not shown) can be provided to enhance reliable operation of the telematics device 10.

Battery 62 is electrically coupled to a suitable charging circuit 64. The charging circuit 64 typically includes suitable charging regulators and voltage and current sensors (such as, in some embodiments, charge sensor 70) that can be monitored by the controller 58 for determining the condition of the battery 62. Charging circuit 64 can receive electrical power from an external power source 66. The external power source 66 may, for example, comprise an array of solar cells, a wind power source, a piezoelectric power source, or other energy harvesting device, or a connection to a more powerful battery or other electrical power transducer or generator (e.g., the electrical system of a tractor).

Charge sensor 70 is coupled to the battery 62 and to controller 58. In one embodiment, an exemplary charge sensor 70 can include a coulomb meter or counter. In further embodiments, charge sensor 70 can include a voltmeter, amp-hour meter, or other battery-capacity monitoring device compatible with battery 62.

In embodiments of the invention, battery charge level information such as the value of a charge level 75 for the battery may be determined by charge sensor 70, by controller 58, or by interaction of charge sensor 70 and controller 58. For example, in one embodiment, charge sensor 70 is configured to determine the charge level 75 of the battery 62 and to inform the controller 58 of the determined charge level 75. In other embodiments, charge sensor 70 provides information to the controller 58 for determining a charge level 75 of the battery 62. Charge level 75 may, for example, be expressed as a percentage, where 100% represents a fully charged battery 62 and 0% represents a fully discharged battery 62.

In some embodiments, exemplary sensing elements 68A-68N coupled to controller 58 can be used for measuring predetermined respective conditions associated with a given mobile asset 12. The sensors 68 are capable of sensing various conditions of the mobile asset 12, and may in some embodiments include, but are not limited to, thermal sensor 68A to sense the temperature of the asset or the temperature of a part of the asset such as a refrigerated cargo compartment or wheel bearings, motion sensors 68B to sense whether the mobile asset 12 is in motion, and door sensors 68N to sense the position of doors or hatches on the mobile asset 12. Further examples of sensors 68 include valve condition sensors to sense the condition of valves on a tank car, impact sensors to measure any impact to the asset, speed sensors to measure the speed of the asset, accelerometers to measure the acceleration of the asset, pressure sensors to sense tire pressure on the asset, and content sensors to determine the presence of material in an area such as a cargo in a trailer. In further embodiments, other data can be determined or extracted from data measured with the sensors 68, including maximum and minimum temperature, maximum and minimum speed, total time stopped (using a clock in addition to the motion sensor), total time moving, and average speed.

Figure 3:
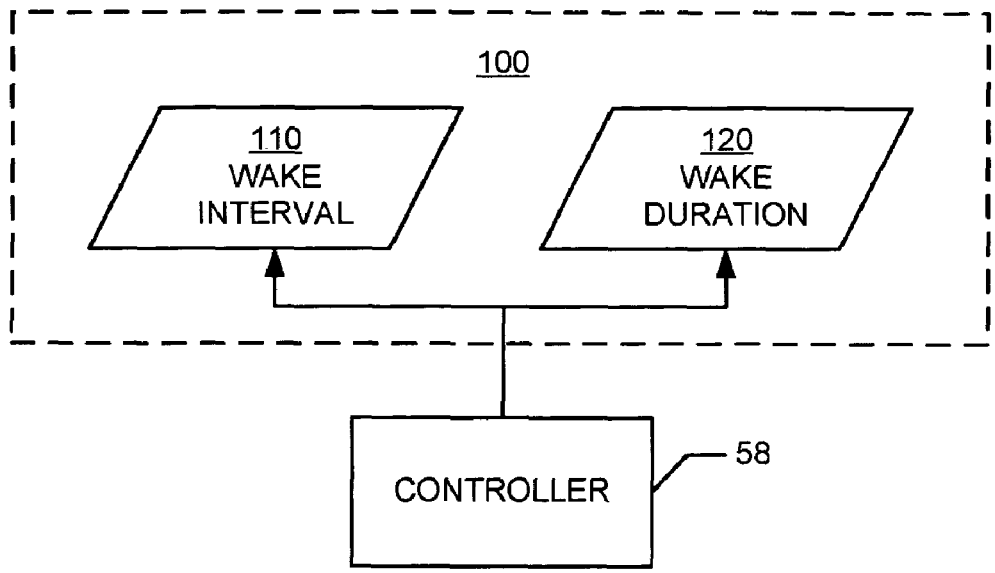
FIG. 3 is a block diagram representation of a duty cycle in an embodiment of the present invention.

FIG. 3 illustrates a duty cycle 100 in an embodiment of the invention. An initial duty cycle 100 can be predetermined or selected, e.g., by a manufacturer or user of the telematics device 10. In an embodiment of the invention, the controller 58 is configured to adjust the duty cycle 100 based on the charge level 75.

The duty cycle 100 comprises a wake interval 110 and a wake duration 120. The wake interval 110 represents a period of time between activations; that is, in an embodiment of the invention, the wake interval 110 is the duration of a low-power mode (such as sleep or hibernating mode). The controller 58 is adapted not to permit the power supply 80 to provide full power to the location device 50 and the communications system 52 during the wake interval 110. During the wake interval 110, the power supply 80 provides limited power to the location device 50 and the communications system 52. Providing "limited power" can include providing no power, providing low power, or providing less than full power.

Conversely, a wake duration 120 represents a period of time during which the telematics device 10 is "awake," that is, not in a low-power mode. The controller 58 is adapted to permit the power supply 80 to provide full power to the location device 50 and the communications system 52 during a wake duration 120. In an illustrative example, if a telematics device 10 is configured to cyclically enter a sleep mode for one hour, and to wake up for five minutes, the wake interval 110 is one hour and the wake duration 120 is five minutes.

A desirable wake duration 120, in an embodiment of the invention, should be sufficient to permit determination of the position of the mobile asset 12, and to permit the position to be communicated to the central station 18. The location device 50, in order to obtain and process information required for determining mobile asset position, must be energized for a sufficient period of time to acquire the navigation signals, which in the exemplary case of GPS are transmitted from any available set of GPS satellites. For example, depending on various initial conditions, such as availability of satellite ephemeris and almanac data, a location device 50 comprising a GPS receiver may require to be energized for at least about 1 or 2 minutes in order to generate data for establishing a position fix. Similarly, the communications system 52 must be energized for a period of time needed to transmit data associated with the mobile asset, and preferably for a period of time sufficient to receive and respond to polling from central station 18.

In some embodiments, upon the establishment of an uplink via communication link 14, the telematics device 10 transmits to the control station 18 identifying information such an asset identifier associated with mobile asset 12 or a device identifier associated with telematics device 10. The telematics device 10 is then able to receive new or queued messages (such as polling requests or "pings") directed to the telematics device 10. The telematics device 10 can respond by transmitting requested information to the control station 18 (e.g., mobile asset position data). In further embodiments, the telematics device 10 can initiate transmission to the control station 18 of information, as desired; for example, the controller 58 may initiate reporting of mobile asset position data, or measurements from any of sensors 68, or alerts based on such measurements. In a still further embodiment, the telematics device 10 can initiate transmission to the control station 18 of information concerning duty cycle 100, wake interval 110, or wake duration 120, such as for the purpose of informing the central station 18 of an adjustment.

In a typical embodiment, a window of about five to seven minutes can be an optimum wake duration 120 for the telematics device 10 to establish a communication link 14 to a communications satellite 16, to receive messages from the control station 18, and to transmit requested or desired information to the control station 18. In an illustrative hypothetical example, the first five minutes of wake duration 120 may be sufficient time for the establishment of the communication link 14 in about 95% of cases; the first seven minutes of wake duration 120 may be sufficient time for the establishment of communication link 14 in about 98% of cases; and the first three hours of wake duration 120 may be sufficient time for the establishment of communication link 14 in nearly 100% of cases.

Figure 4:
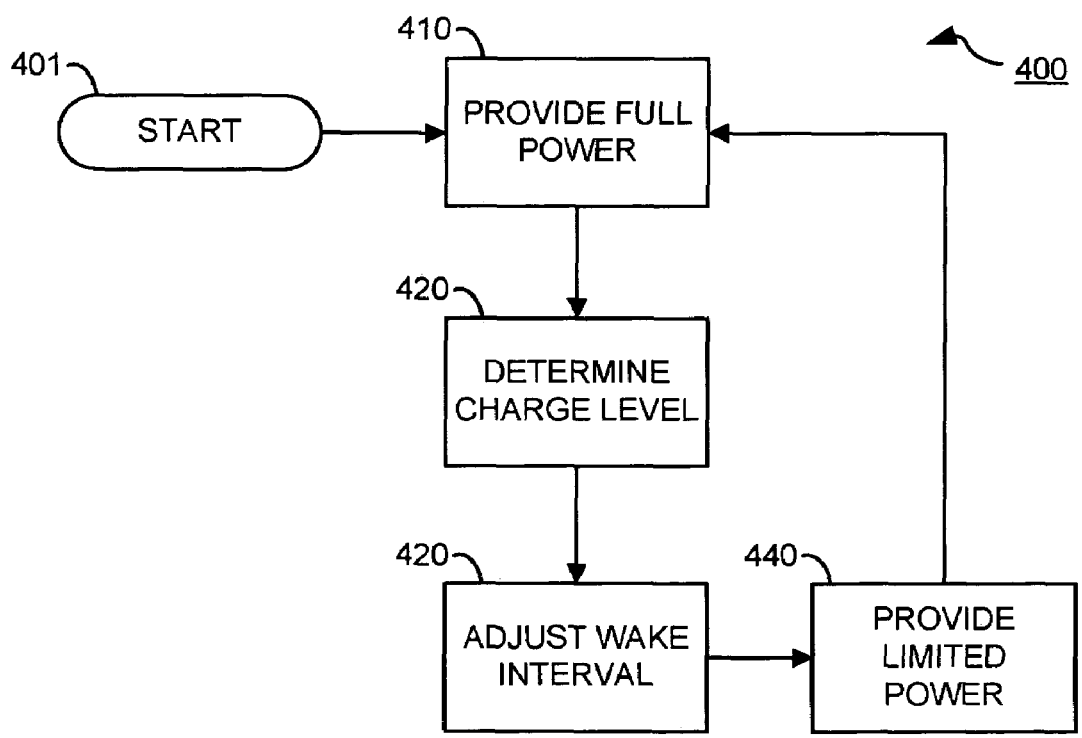
FIG. 4 is a flowchart of a method according to an embodiment of the present invention.

FIG. 4 shows a method 400 for adjusting a wake interval 110 in a telematics device 10 having a charge sensor 75, according to an embodiment of the present invention. An exemplary duty cycle 100 is illustrated in which a telematics device 10 cyclically provides full power from a power supply 80 during wake duration 120, and limited power from the power supply 80 during wake interval 110.

The method 400 begins at start block 401, and proceeds to block 410. At block 410, the telematics device 10 provides full power from a power supply 80 during wake duration 120. At block 420, a charge level 75 for a battery 62 of the power supply 80 is determined using the charge sensor 70. At block 430, the wake interval 110 is adjusted based on the charge level 75. At block 440, the telematics device 10 provides limited power from the power supply 80 during the wake interval 110. At the end of the wake interval 100, the method 400 then cycles back to block 410.

Figure 5:
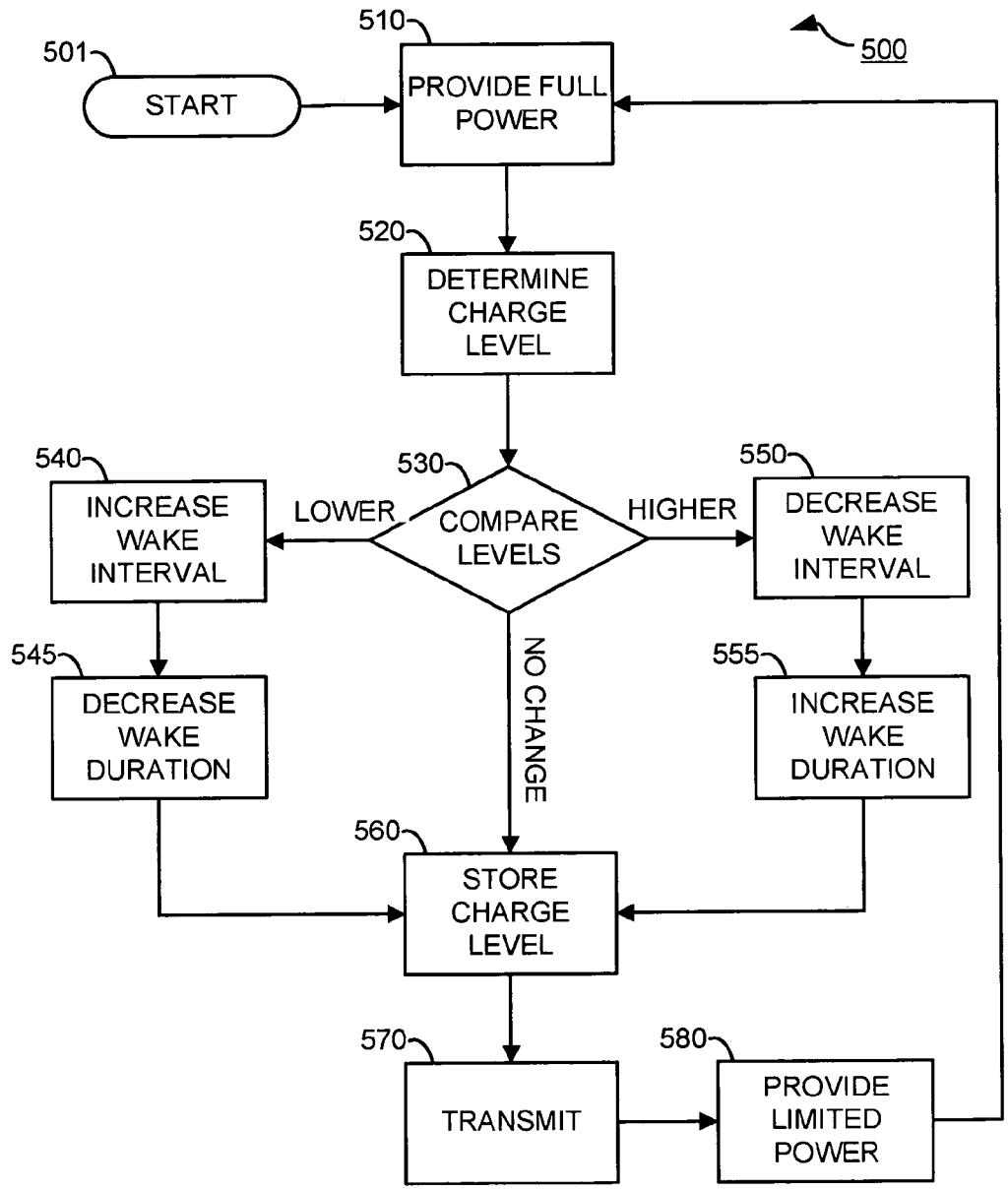
FIG. 5 is a flowchart of a method according to a further embodiment of the present invention.

FIG. 5 shows a method 500 for adjusting a wake interval 110 in a telematics device 10 having a charge sensor 75, according to an further embodiment of the present invention. An exemplary duty cycle 100 is illustrated in which a telematics device 10 cyclically provides full power from a power supply 80 during wake duration 120, and limited power from the power supply 80 during wake interval 110.

The method 500 begins at start block 501, and proceeds to block 510. At block 510, the telematics device 10 provides full power from a power supply 80 during wake duration 120. At block 520, a charge level 75 for a battery 62 of the power supply 80 is determined using the charge sensor 70.

At block 530, the charge level 75 is checked against a previously stored charge level 75. If the new charge level 75 is substantially unchanged from the previously stored charge level 75, the method 500 proceeds to block 560. If the new charge level 75 is substantially lower than the previously stored charge level 75, the method 500 proceeds to block 540. If the new charge level 75 is substantially higher than the previously stored charge level 75, the method 500 proceeds to block 550. The amount of change that is considered substantial is predetermined as part of the programming of the controller 58, taking into account granularity of the measurement provided by charge sensor 70. The granularity may vary from embodiment to embodiment. In one illustrative embodiment, the granularity of the measurement of the charge level 75 is not likely to be finer than about ten percent steps (e.g., a charge level 75 may have a series of values indicating about 0% charge, about 10% charge, about 20% charge, and continuing in about ten percent steps to about 100% charge). In other embodiments, a finer or coarser granularity of measurement may be available from the charge sensor 70.

At block 540, responsively to a decrease in the charge level 75, the controller 58 can increase the wake interval 110. In some embodiments, at block 545, the controller 58 can also decrease the wake duration 120 responsively to the decrease in the charge level 75. A decrease in the charge level 75 is generally associated with the operation of the telematics device 10 in the absence of substantial charging of the battery 62 through the charging circuit 64 from external power supply 66. In some embodiments, if the power supply 80 is not receiving external power, and if the charge level 75 is near zero, the controller 58 can increase the wake interval 110 to a predetermined maximum value of the wake interval 110, decrease the wake duration 120, and can trigger an alert to control station 18, which can take place during the wake duration 120 (such as at block 570), where the alert indicates a distressed battery condition. The method 500 then proceeds to block 560.

At block 550, responsively to an increase in the charge level 75, the controller 58 can decrease the wake interval 110. In some embodiments, at block 545, the controller 58 can also increase the wake duration 120 responsively to the increase in the charge level 75. An increase in the charge level 75 is generally associated with charging of the battery 62 through the charging circuit 64 from external power supply 66. In some embodiments, if the power supply 80 is receiving external power, the controller 58 decreases the wake interval 110 to zero, so as to maintain a fully awake state of the telematics device 10 while the mobile asset 12 is powered. In other embodiments, if the power supply 80 is receiving external power, and if the charge level 75 is high (e.g., about 100%, or higher than a predetermined value), the controller 58 decreases the wake interval 110 to a predetermined minimum value of the wake interval 110. The method 500 then proceeds to block 560.

In some embodiments, the controller 58 at block 540 increases the wake interval 110 responsively to a decrease in charge level 75, and at block 550 decreases the wake interval 110 responsively to an increase in charge level 75 that is proportionately greater than the previous decrease in charge level 75. Such embodiments help to prevent hysteresis by providing a safety band, so that a more substantial change in charge level 75 is required to trigger a shorter wake interval 110 than is required to trigger a longer wake interval 110. In an illustrative example, using ten percent steps of granularity, when the charge level 75 decreases from 80% charge to 70% charge, an increase in the wake interval 110 may be triggered; however, when the charge level 75 then increases from 70% charge to 80% charge, a corresponding decrease in the wake interval 110 is not triggered. Rather, the increase in the wake interval 110 is triggered when the charge level 75 increases an additional step, i.e., from a 70% charge to a 90% charge.

At block 560, the charge level 75 is stored by the controller 58, such as in memory associated with the controller 58. If the charge level 75 is unchanged from a previous value, the storage step of block 560 can optionally be skipped, or the storage step of block 560 may still be performed so as to maintain a historical record over a period of time.

At block 570, the telematics device 10 transmits information to control station 18. In one embodiment, the transmitted information comprises identifying information for the telematics device 10 or the mobile asset 12. In other embodiments, the information can include other information, such as mobile asset position data, and information responsive to requests received from the control station 18. In further embodiments, the information can include alerts to the control station 18, such as an indicator of a distressed battery condition, or an indicator of a change in the duty cycle 100, the wake interval 110 or the wake duration 120.

At block 580, the telematics device 10 enters a low-power mode during the wake interval 110, wherein the device 10 provides limited power from the power supply 80. At the end of the wake interval 100, the method 500 then cycles back to block 510.

It is to be understood that the present invention is not limited to the embodiments described above, but encompasses any and all embodiments within the scope of the following claims.

What is claimed is:

1. A method for adjusting a wake interval in a telematics device having a charge sensor, comprising:
   cyclically providing full power from a power supply during a wake duration, and limited power from the power supply during the wake interval;
   determining a charge level for a battery of the power supply using the charge sensor;
   storing the charge level;
   comparing the charge level to a previously stored charge; and
   adjusting the wake interval based on the charge level;
   wherein adjusting the wake interval comprises:
      increasing the wake interval responsively to a charge level decrease; and
      decreasing the wake interval responsively to a charge level increase that is proportionately greater than the charge level decrease.

2. The method of claim 1 further comprising skipping the adjusting step if the charge level is substantially the same as the previously stored charge level.

3. The method of claim 1 wherein adjusting the wake interval comprises:
   decreasing the wake duration responsively to a charge level decrease.

4. The method of claim 1 wherein adjusting the wake interval comprises:
   increasing the wake duration responsively to a charge level increase.

5. The method of claim 1 wherein the step of adjusting the wake interval is performed during the wake duration.

6. The method of claim 1 further comprising:
   alerting a control station to a duty cycle adjustment.

7. The method of claim 1 further comprising:
   transmitting an asset position during the wake duration.

8. The method of claim 1 further comprising:
   decreasing the wake interval to zero if the power supply is receiving external power.

9. The method of claim 1 further comprising:
   decreasing the wake interval to a predetermined minimum wake interval if the power supply is receiving external power and if the charge level is high.

10. The method of claim 1 further comprising, if the power supply is not receiving external power and if the charge level is near zero:
   increasing the wake interval to a predetermined maximum wake interval;
   decreasing the wake duration; and
   alerting a control station, during the wake duration, to a distressed battery condition.

11. A system for adjusting a wake interval in a telematics device, comprising:
   a power supply configured to provide power to a location device and a communications system;
   a controller operably coupled to the location device, to the communications system, to the power supply, and to a charge sensor adapted to provide charge level information to the controller for a battery of the power supply;
   wherein the controller is configured to permit the power supply to provide full power to the location device and the communications system during a wake duration, and not to permit the power supply to provide full power to the location device and the communications system during the wake interval;
   wherein the controller comprises a memory capable of storing the charge level information;
   wherein the controller is adapted to compare the charge level information to previously stored charge level information;
   wherein the controller is adapted to adjust the wake interval responsively to the charge level information; and
   wherein the controller is adapted to increase the wake interval responsively to a charge level decrease, and to decrease the wake interval responsively to a charge level increase that is proportionately greater than the charge level decrease.

12. The system of claim 11 wherein the power supply provides limited power to the location device and the communications system.

13. The system of claim 11 wherein the controller is adapted to decrease the wake duration responsively to a charge level decrease.

14. The system of claim 11 wherein the controller is adapted to increase the wake duration responsively to a charge level increase.

15. The system of claim 11 wherein the controller is adapted to adjust the wake interval during the wake duration.

16. The system of claim 11 wherein the controller is adapted to transmit an alert through the communications system to a control station, the alert comprising duty cycle adjustment information.

17. The system of claim 11 wherein the controller is adapted to transmit an asset position through the communications system to a control station during the wake duration.

18. The system of claim 11 wherein the controller is adapted to decrease the wake interval to zero when the power supply receives external power.

19. The system of claim 11 wherein the controller is adapted to decrease the wake interval to a predetermined minimum wake interval when the power supply receives external power and the charge level is high.

20. The system of claim 11 wherein the controller is adapted, when the power supply is not receiving external power and the charge level is near zero, to increase the wake interval to a predetermined maximum wake interval, to decrease the wake duration, and to transmit an alert through the communications system to a control station during the wake duration, the alert comprising a distressed battery indication.

* * * * *